United States Patent [19]

Dames

[11] Patent Number: 5,796,250
[45] Date of Patent: Aug. 18, 1998

[54] PLURAL ROTARY MEMBER POSITION ENCODER HAVING ELECTROMAGNETICALLY COUPLED RESONANT FREQUENCY MULTIPLEXED OUTPUTS FOR RESPECTIVELY ASSOCIATED ROTATABLE MEMBERS

[75] Inventor: Andrew Nicholas Dames, Cambridge, United Kingdom

[73] Assignee: Scientific Generics Limited, Cambridge, England

[21] Appl. No.: 545,681

[22] PCT Filed: May 3, 1994

[86] PCT No.: PCT/GB94/00948

§ 371 Date: Dec. 14, 1995

§ 102(e) Date: Dec. 14, 1995

[87] PCT Pub. No.: WO94/25829

PCT Pub. Date: Nov. 10, 1994

[30] Foreign Application Priority Data

May 1, 1993 [GB] United Kingdom .................. 9309073

[51] Int. Cl.[6] .................. G01D 5/20; G01B 7/14; G01B 7/30; G08C 15/02
[52] U.S. Cl. .................. 324/207.22; 324/207.25; 324/207.17; 340/870.02; 340/870.31
[58] Field of Search .................. 324/207.25, 207.22, 324/207.17, 226, 262; 336/30, 73, 75, 79, 120, 121, 127; 340/870.02, 870.03, 870.31

[56] References Cited

U.S. PATENT DOCUMENTS

| | | |
|---|---|---|
| 3,598,903 | 8/1971 | Johnson et al. . |
| 4,037,219 | 7/1977 | Lewis . |
| 4,401,986 | 8/1983 | Trenkler et al. . |
| 4,507,639 | 3/1985 | Trenkler et al. . |
| 4,737,698 | 4/1988 | McMullin et al. . |
| 4,829,247 | 5/1989 | Wallrafen .................. 324/207.17 |

FOREIGN PATENT DOCUMENTS

| | | |
|---|---|---|
| 1437068 | 5/1976 | United Kingdom . |
| 2128752A | 5/1984 | United Kingdom . |
| 2217849A | 11/1989 | United Kingdom . |
| WO 92/12401 | 7/1992 | WIPO . |

*Primary Examiner*—Walter E. Snow
*Attorney, Agent, or Firm*—Nixon & Vanderhye P.C.

[57] ABSTRACT

An apparatus for indicating the angular position of a rotatable member includes a drive coil with its axis corresponding to the axis of rotation of the rotatable member. A coil is wound around the rotatable member, and a capacitor is provided in the coil to form an LC resonant circuit. The coil on the rotatable member is wound so that application of an alternating magnetic field to the drive coil induces a resonance in the LC circuit which is constant for all angular positions of the rotatable member. Pick-up coils are provided such that the planes of these coils and the drive coil are orthogonal. The resonance of the LC circuit produces signals in the output coils which depend upon the angular position of the rotatable member. The signals may be processed to determine that angular position, and the processing is simplified with this arrangement of output coils since the signals produced therein are quadrature signals.

48 Claims, 11 Drawing Sheets

PLURAL ROTARY MEMBER POSITION ENCODER HAVING ELECTROMAGNETICALLY COUPLED RESONANT FREQUENCY MULTIPLEXED OUTPUTS FOR RESPECTIVELY ASSOCIATED ROTATABLE MEMBERS

BACKGROUND OF THE INVENTION

1. Field of the Invention

The invention relates to a method and apparatus for indicating the position of a movable member e.g. a dial, wheel or shaft. For example, the invention may be applied to the determination of the position of the dials in a meter such as a water, gas or electricity meter or to rotary encoders in general.

2. Related Art

In a known rotary encoding system for dials of a meter each dial has a pair of spring wipers that travel over and make contact with a track on an associated printed circuit board as the dial rotates. One of the tracks is continuous and the other is interrupted to define a number of contact pads equal to the number of digits carried by the dial (e.g. 0–9). As each dial rotates the wiper contacts successive pads and completes a circuit on each occasion giving an indication of dial position which can be transmitted to a central monitoring station. To ensure reliability of operation, each dial is required to rotate in indexed steps so that its contact is always with one of the pads, and to cause this to happen each dial is controlled by a "snapper" which causes the dial to snap from one position to another in indexed steps. However, the use of snappers increases the torque needed to operate the mechanism which, in the case of an inferential meter such as a water meter, can significantly impede the operation thereof. Furthermore, this system requires that each set of dials to be monitored should have its own circuit board and associated logic circuits which adds to cost, particularly since the tracks and wipers are usually gold plated to ensure reliability of the contact.

A previous non-contact position sensing mechanism uses magnetostrictive resonators and bias elements for applying a magnetic bias field for indicating the relative positions of two members. In such systems, an interrogating alternating magnetic field is applied when it is desired to read the position of the members, and the positions are determined on the basis of the detected signal, which has been modified by the magnetostrictive resonators in such a way that depends on the relative positions of the bias elements and magnetostrictive resonators themselves. However, these systems must overcome the problem that the amount of interrogating alternating magnetic field which is coupled into the magnetostrictive resonator is proportional to the magnetic bias applied by a bias element, which means that the system will be susceptible to external magnetic fields. These prior art devices and techniques suffer from the further disadvantage that a plurality of magnetostrictive resonators and/or bias elements are required, making construction complex and expensive.

A problem with which this invention is concerned is the position of an angular position sensing system for one or more rotary members that does not require a direct electrical contact with the or each rotary member and is of simple construction.

SUMMARY OF THE INVENTION.

According to a first aspect of the present invention, there is provided an apparatus for indicating the angular position of a rotatable member wherein a field is coupled from input means to output means via an intermediate device the coupling being such that the field in the output means is a function of the angular position of the rotatable member.

According to the invention, there is provided an apparatus for indicating the angular position of a rotatable member, comprising input means for supplying energy to an intermediate device, and output means for receiving energy from said intermediate device in response thereto, the intermediate device having an axis which varies so that the energy received by the output means varies as a function of said angular position.

According to the invention, there is also provided a method of determining the angular position of a rotatable member comprising supplying energy to the input means of such an apparatus, detecting the energy in the output means produced in response thereto, and deriving therefrom said angular position.

According to a further aspect of the invention, there is provided a method of reading a meter comprising supplying energy to the input means of such an apparatus which is a meter comprising a plurality of dials, detecting the energy in the output means produced in response thereto, and deriving therefrom the reading of the meter.

BRIEF DESCRIPTION OF THE DRAWINGS.

Various embodiments will now be described, by way of example only, with reference to the accompanying drawings in which:

FIG. 14b is a diagrammatic view obliquely from one side of one dial of the assembly shown in FIG. 15a;

FIG. 16b illustrates one form of the planar etched LC resonator used in the form shown in FIG. 16a;

FIG. 17b shows one method of mounting the components necessary for making the circuit of FIG. 17a;

DETAILED DESCRIPTION OF EXEMPLARY EMBODIMENTS.

Figure 1:
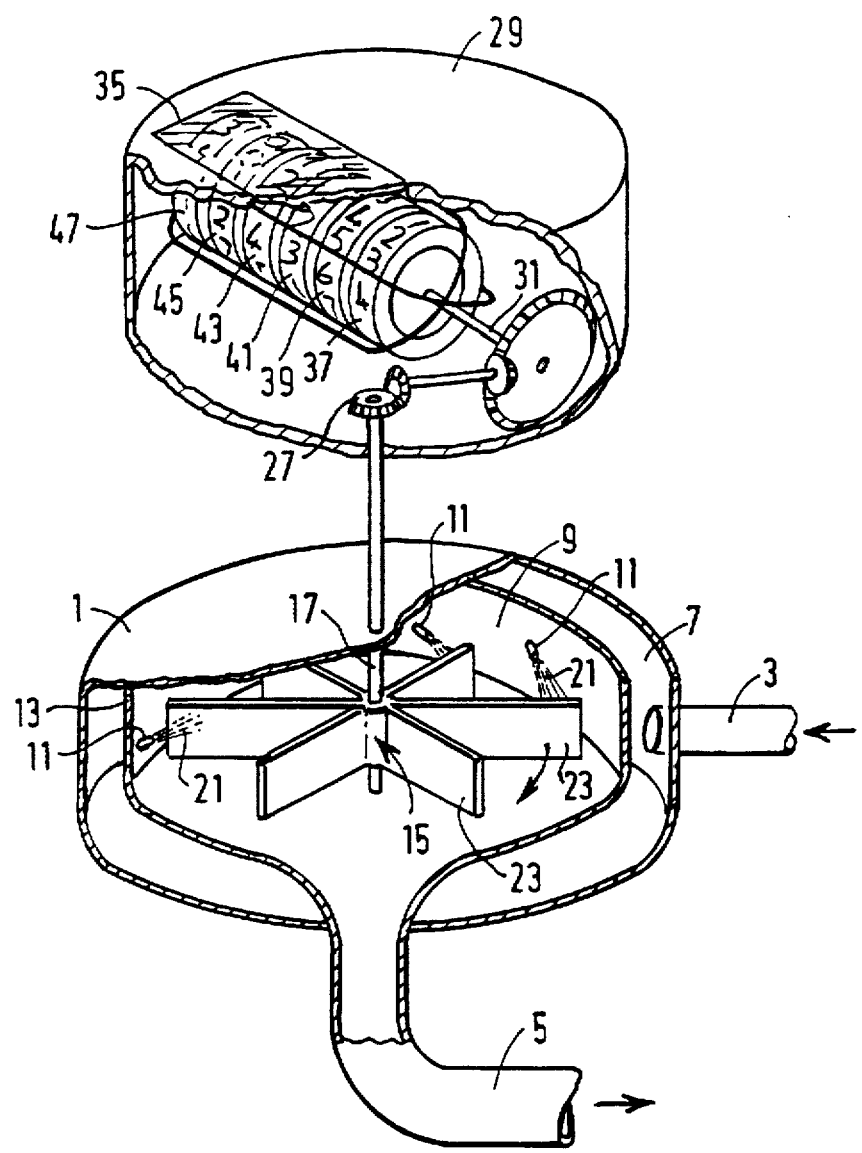
FIG. 1 diagrammatically illustrates a remotely readable inferential meter, such as a water meter, comprising six dials according to one embodiment.

FIG. 1 shows an inferential water meter according to a first embodiment. In FIG. 1, there is a turbine 1 for sensing the flow of water, having an inlet pipe 3 and outlet pipe 5. The inlet pipe is in communication with an outer chamber 7 of the turbine 1, and the outlet pipe is in communication with an inner chamber 9 of the turbine 1. The outer chamber 7 communicates with the inner chamber 9 by means of angled apertures 11 in the side wall 13 of the inner chamber 9. Within the inner chamber 9 is a bladed rotor 15 connected to a spindle 17, which passes up through the top of the turbine 1, and is connected to reduction gearing diagrammatically shown at 27, which will typically be of the order of 1000:1, held within a dial housing 29. Connected to the other end of the reduction gearing 27 is an output spindle 31, which is connected to a set of dials 37-47. The position of the dials 37-47 is such that they are visible through a window 35 which may be on the upper surface of the housing 29 or at any convenient location.

In operation, water enters the outer chamber 7 of the turbine mechanism 1 via the inlet pipe 3, and passes through into the inner chamber 9 via the angled apertures 11. These apertures are angled so that jets of water 21 are directed onto the rotor blades 23 so that water passing from the pipe 3 to the pipe 5 has to traverse the blades of the rotor 15 so that rotation of the rotor measures the volume of water that has passed through the turbine.

The dials 37-47 are mounted for rotation on the spindle 31, and each is marked with the digits 0 to 9 around its periphery, although there could clearly be any number of digits marked around its periphery. The dials are driven by the spindle 31 and are interconnected, without snappers, in a conventional manner (not shown) so as to form a six decade counter, the six dials representing, respectively, the digits of a six digit number in a conventional manner. The value representing the current rotary position of each dial can be visually inspected through the window 35.

Figure 2:
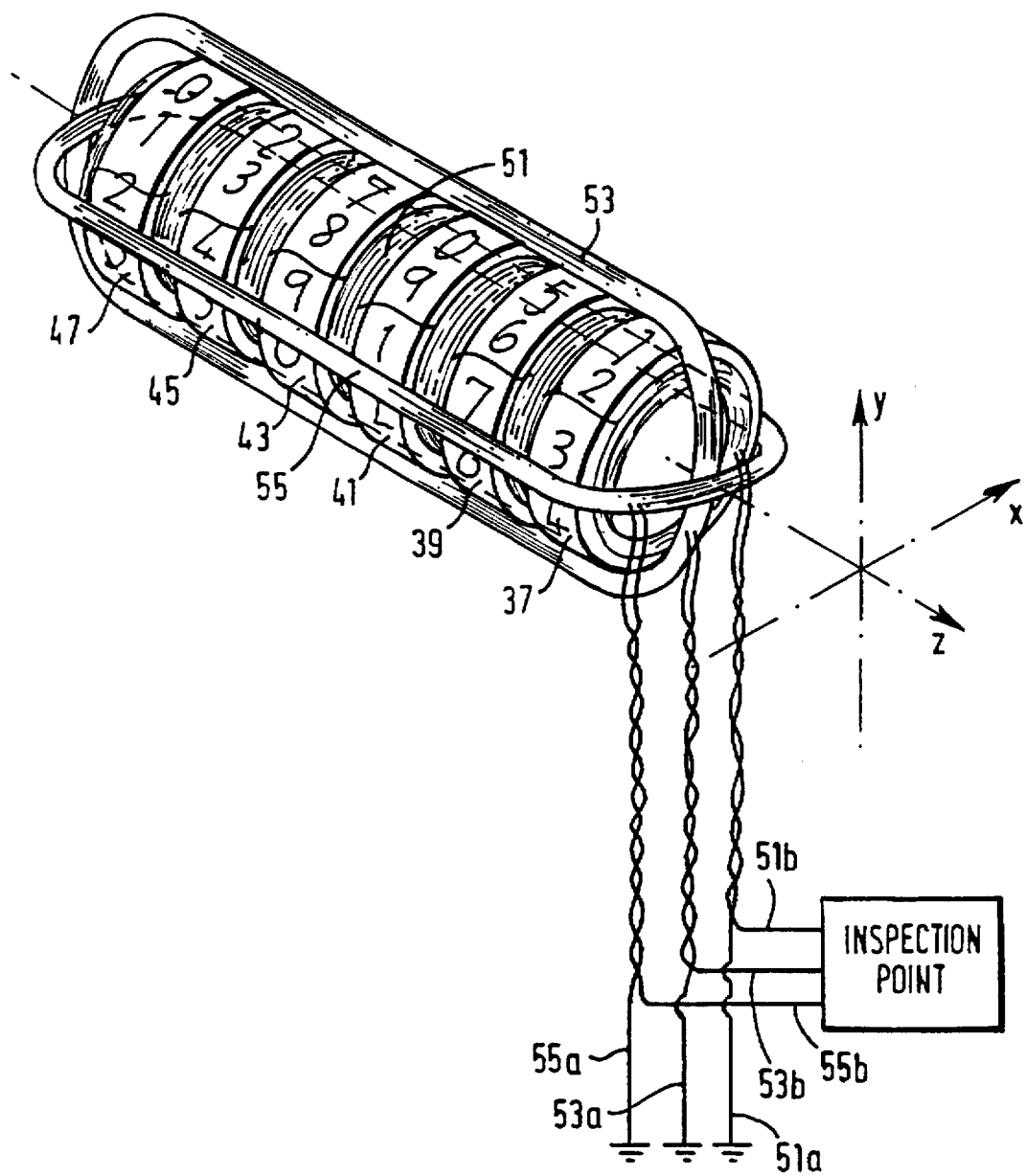
FIG. 2 is a diagrammatic isometric view on an enlarged scale of the dials, the drive coil and the pick-up coils forming part of the meter of FIG. 1.

FIG. 2 shows in more detail the elements necessary for remotely sensing the position of the dials 37-47, according to the present embodiment.

With reference to FIG. 2, around the dials there are provided three coils 51, 53 and 55, the planes of which are substantially orthogonal to each other. The coil 51 is, in this embodiment, used as a drive coil, and may consist of a single piece of Litz wire, although any wire will do, which is formed into a multiplicity of coiled regions, in this case seven regions. Litz wire is available from Elektrisola Dr. Gerd Schildbach GmbH & Co., of Inderhuvttenwiese D-5226 Reichshof-Eckenhagen, Germany and is preferred because it is a multi-stranded wire having low AC resistance. As can be seen from FIG. 2 a coiled region is provided at each end of the assembly, and a region is also provided between each pair of dials. All of the coiled regions are provided around the spindle as shown. Coil 53 is a multi-turn coil used as a pick-up, and is made, for example, from a single piece of Litz wire, that is wrapped around the dials in the y-z plane. Coil 55 is used as another pick-up coil, and is another multi-turn coil which is wrapped around the dials several times in the x-z plane, and may also be Litz wire. One end of each of these coils is for connection to ground and the other ends are for connection externally to an inspection point, such that when someone wishes to read the meter remotely, they simply apply an appropriate interrogation signal to the drive coil. This, as will be explained below, results in signals being received on the pick-up coils that carry the information about the orientation of each dial. The information carried by the signals may then be retrieved, for example by means of a microprocessor and may be stored in a memory for subsequent downloading into a main computer.

Figure 3A:
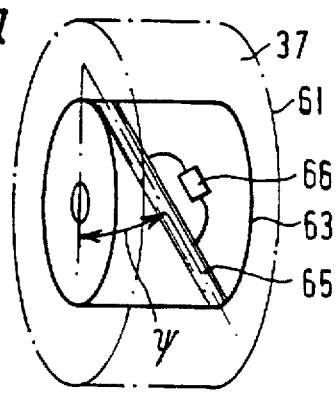
FIG. 3a is a diagrammatic view obliquely from one side of one dial of the assembly shown in FIG. 2.

FIG. 3a shows the typical configuration of each dial according to this embodiment. In particular there is shown the outer casing 61 of the dial 37. A wheel hub 63 is connected thereto and a fourth coil 65, preferably of Litz wire, is wrapped around its periphery, such that the coil 65 lies in a plane set at an angle $\psi$ to the plane of the dial itself. Further, according to this embodiment, there is a capacitor 66 connected between the ends of the coil 65, so as to form a resonant circuit.

The mechanism of remote sensing will now be explained with reference to FIGS. 4-10.

Figure 4A:
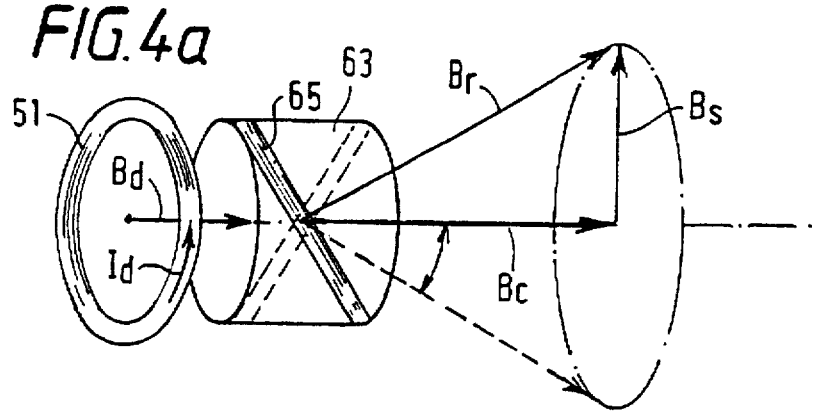
FIG. 4a is a diagram which illustrates the direction of the magnetic flux densities produced by currents flowing in the drive coil and the wheel hub coil as the dial of FIG. 3a rotates.

FIG. 4a hows a region of the drive coil 51 with a current $I_d$ flowing through it, which gives rise to a magnetic flux directly proportional to $I_d$ in the direction of the axis of the coil 51.

It is known in the art, that an electromotive force (EMF) is induced in a coil placed in a magnetic flux density whenever the flux density through the coil changes. In fact, the magnitude of the induced EMF in the coil is directly proportional to the rate of change of flux-linkage, where the flux-linkage is given by the component of the magnetic flux density lying along the axis of the coil, multiplied by the number of turns in the coil and the area of the coil through which the magnetic flux can couple.

Therefore, with reference to FIG. 2, the magnetic flux density produced by the current $I_d$ in the drive coil 51, will not induce an EMF in either of the pick-up coils 53 or 55 because they are perpendicular to the drive coil 51 and hence there is no flux-linkage. However, with reference to FIG. 4a, an EMF will be induced in the wheel hub coil 65 since the flux-linkage with this coil is not zero, and is given by:

$$Flux\text{-}linkage = N_r A B_d \cos \psi \tag{1}$$

where A is the area of the wheel hub coil 65, through which the magnetic flux can couple, $N_r$ is the number of turns of the wheel hub coil 65 and $\psi$ is the angle between the axis of the dial and the axis of the wheel hub coil. Therefore, if the current flowing in the drive coil is given by the following expression:

$$I_d = \hat{I}_d \cos 2\pi f t \tag{2}$$

then the EMF induced in the wheel hub coil 65, which is proportional to the rate of change of equation 1, will have the following form:

$$EMF_r = E_r \sin 2\pi f t \tag{3}$$

i.e. the sinusoidally varying current in the drive coil 51 induces a sinusoidally varying EMF in the wheel hub coil 65 of the same frequency but 90° out of phase. Note that the magnitude of the EMF induced is independent of the position of the dial because the wheel hub coil 65 lies at a constant angle $\psi$ to the axis of the drive coil 51.

Figure 4B:
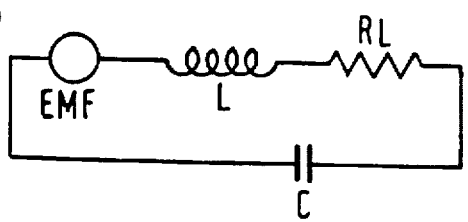
FIG. 4b illustrates the electrical equivalent circuit of the wheel hub coil circuit.

With reference to the electrical equivalent circuit of the wheel hub coil 65 shown in FIG. 4b, the current flowing in the wheel hub coil 65 will be given by the EMF divided by the impedance of the circuit, i.e. the current in the wheel hub coil ($I_r$) is given by the following equation:

$$I_f = \frac{E_f \sin[2\pi f t - \alpha]}{\sqrt{R_L^2 + \left[2\pi f L - \frac{1}{2\pi f c}\right]^2}} \tag{4}$$

where $R_L$ is the resistance and L is the inductance of the wheel hub coil 65, C is the capacitance of the capacitor 66 and $\alpha$ is a phase shift introduced by the R-L-C circuit.

Note that $I_r$ will be a maximum when the frequency of the current in the drive coil is equal to the resonant frequency of the wheel hub coil circuit, and under such circumstances $\alpha$ will be zero. The importance of this will be explained later.

In a similar way to the drive coil, the current flowing in the wheel hub coil ($I_r$) will produce a proportional magnetic flux density in the direction of its axis. Therefore, as shown in FIG. 4a, a magnetic flux density $B_r$ in the direction of the axis of the wheel hub coil 65 will be produced, and can be represented by the following equation:

$$B_r = K\hat{I}_r \sin [2\pi f t - \alpha] \tag{5}$$

where $\hat{I}_r$ is the peak value of the current in the wheel hub coil 65, and K is a constant of proportionality that depends on the physical nature of the wheel hub coil 65, i.e. the number of turns, the radius, etc.

Figure 5:
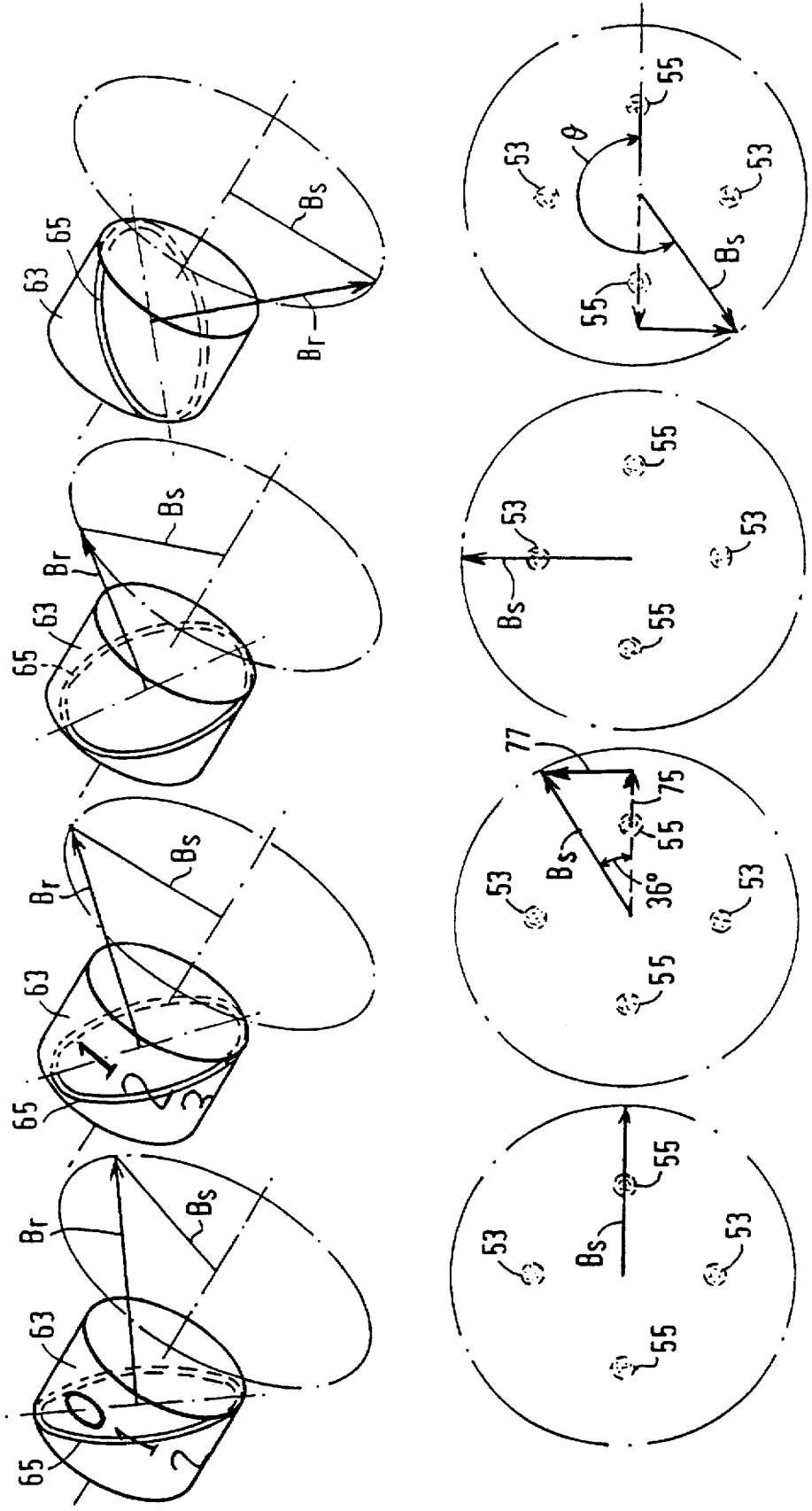
FIG. 5 diagrammatically illustrates the direction of the magnetic flux density, and the components thereof, produced by the current flowing in the wheel hub coil at different dial positions.

As will be shown below, it is possible for the magnetic flux density produced by the current in the wheel hub coil ($B_r$), to induce an EMF in both pick-up coils 53 and 55, whose magnitude depends upon the position of the dials 37–47. FIG. 4a shows, that as the wheel hub 63 rotates, the direction of the magnetic flux density $B_r$ changes, and in fact traces out the shape of a cone. The EMF induced in pick-up coils 53 and 55 as a result of the changing flux linkage with B$r$ depends upon the components of $B_r$ along the axes of pick-up coils 53 and 55. The flux density B$r$ may be resolved into its constituent parts lying on the axis of the dials and perpendicular thereto, i.e. $B_c$ and $B_s$ shown in FIG. 4a. Axial component $B_r$ lies perpendicular to the plane of the pick-up coils 53, 55 and as explained above, it can therefore not induce an EMF in either pick-up coil. Radial component $B_s$ is therefore the only component of the flux density B$r$ that can induce an EMF in the pick-up coils. However, as the dial rotates $B_s$ rotates and so the amount of EMF induced in each pick-up coil will change. To illustrate this point, FIG. 5 shows four representations of the coils in different positions. Underneath each representation is a sectional view of the dials showing only the pick-up coils 53 and 55 and the vector path of component $B_s$.

In the first representation the dial is in position '0' i.e. zero will be seen through the window 35 shown in FIG. 1. In this representation $B_s$ lies in a plane perpendicular to pick-up coil 53 and parallel to pick-up coil 55. Therefore, the EMF induced in coil 53 will be at a maximum and the EMF induced in pick-up coil 55 will be zero.

In the second representation, the dial has moved round to '1', therefore, $B_s$ now lies at an angle of 36° to the horizontal. To determine the amount of EMF induced in both coils 53 and 55, it is necessary to resolve $B_s$ into its components lying along the axes of the two pick-up coils 53 and 55, i.e. components 75 and 77 respectively. Component 75 is given by $B_s \cos 36°$ and component 77 is given by $B_s \sin 36°$.

In the third representation, the dial has reached a point where $B_s$ lies in the plane perpendicular to pickup coil 55 and parallel to the coil 53. Therefore, there will be no EMF induced in pick-up coil 53 and there will be a maximum EMF induced in pick-up coil 55.

In the last representation of FIG. 5, $B_s$ is at a general angle $\theta$. Therefore, the EMF induced in pick-up coil 53 will be due to component 75, which is given by $B_s \cos \theta$, and the EMF induced in pick-up coil 55 will be due to component 77, which is given by $B_s \sin \theta$.

Therefore, by using the same analysis used for determining the EMF induced in the wheel hub coil 65, the EMF's induced in the two pick-up coils 53 and 55 will be dependent on the rate of change of components 75, 77 respectively and can be represented by:

$$E_{53} = \hat{E} \cos \theta \cos [2\pi f t - \alpha] \tag{6}$$

$$E_{55} = \hat{E} \sin \theta \cos [2\pi f t - \alpha] \tag{7}$$

This is assuming that the areas of pick-up coils 53 and 55 through which the respective fluxes can couple and the number of turns in each pick-up coil are the same, and that the rate at which the dial changes is negligible compared to the rate at which the current applied to the drive coil changes.

Figure 6:
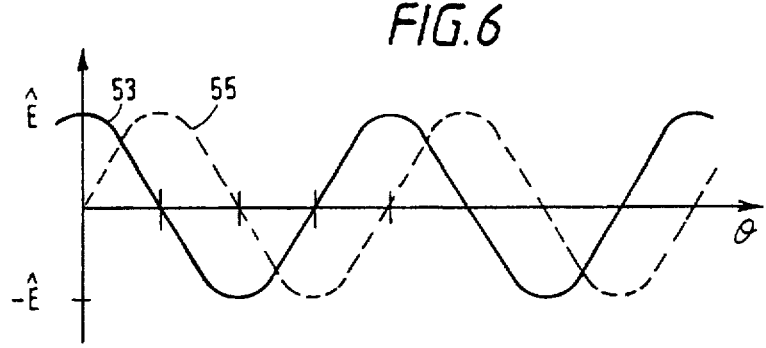
FIG. 6 is a graph which illustrates for the assembly of FIG. 2 the quadrature signals on the pick-up coils as one of the dials is rotated.

FIG. 6 shows how the peak magnitude of the EMF's induced in pick-up coils 53 and 55 vary as the value of $\theta$ varies, i.e. as the dial rotates. It will be noted that the outputs of the two coils are amplitude modulated signals whose peak magnitudes vary sinusoidally with the angular position of the dials and whose peak magnitudes are in quadrature, thereby carrying unique information about the dial angular position.

The above equations, for the EMF induced in the pick-up coils, have been calculated with respect to a single dial. However, in the water meter system of the present embodiment, there are six such dials. Although there could be any number of dials including one, and the invention is not limited in this manner. Therefore, by superposition, the total EMF induced will be given by the summation of six of these signals, i.e:

$$E_{53}^{TOT} = \sum_{i=1}^{6} \hat{E}^i \cos\theta_i \cos|2\pi ft - \alpha_i| \quad (8)$$

$$E_{55}^{TOT} = \sum_{i=1}^{6} \hat{E}^i \sin\theta_i \cos|2\pi ft - \alpha_i| \quad (9)$$

Equations 8 and 9 have the typical form of an amplitude modulated signal, ie. there is a carrier signal $|\cos(2\pi ft - \alpha_i)|$ which is amplitude modulated by $\hat{E}^i \cos\theta_i$ in pick-up coil 53 and $\hat{E}^i \sin\theta_i$ in pick-up coil 55. Therefore, in order to determine the orientation of each dial, these signals will have to be demodulated.

There are many known techniques available for demodulating an amplitude modulated signal. In the present embodiment the modulated signal is multiplied by a phase shifted version of the voltage applied to the drive coil, and then low pass filtered. In the drawings, for simplicity, this has been illustrated as being a 90° phase shift. However, as the skilled man will realise, the amount of phase shift required depends on the phase shift introduced by the drive and pick-up circuits, which depends on the components used. As will be explained below, the filtered signals are then fed into a microprocessor via an analogue-to-digital converter (not shown), where the values of $\theta_i$ are ascertained.

Figure 7:
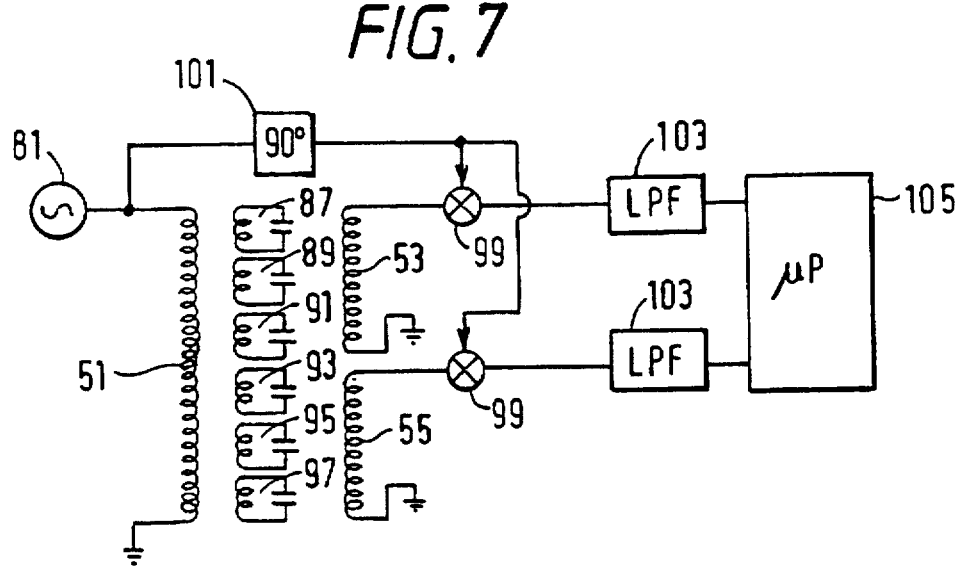
FIG. 7 is an electrical equivalent circuit of the meter system according to the first embodiment.

FIG. 7 shows the electrical equivalent circuit of the system for remotely sensing the orientation of the dials in this embodiment, and will be used to summarise the analysis above and explain further the remaining elements of the system.

With reference to FIG. 7, an interrogating voltage source 81 is applied across drive coil 51. This causes a current to flow in the drive coils which induces a current to flow in the resonant circuits 87–97 associated with the respective dial 37–47. These currents in turn induce a current in each of the pick-up coils 53 and 55, the magnitude of which depends on the position of each dial. The signals from each of the pick-up coils are then mixed in mixers 99 with a 90° phase shifted version of the interrogaating voltage source 81, and then filtered in low pass filters (103) to produce demodulated signals $S_{53}$, $S_{55}$ given by the equations:

$$S_{53} = \sum_{i=1}^{6} \hat{E}^i \cos\theta_i \cos\alpha_i \quad (10)$$

$$S_{55} = \sum_{i=1}^{6} \hat{E}^i \sin\theta_i \cos\alpha_i \quad (11)$$

A problem with these demodulated signals is that the information about the position of each dial is received at the same time. However, if the peak magnitude $\hat{E}$ of the EMF induced in the pick-up coils from the effect of one dial is much larger than the value of $\hat{E}$ for the other dials, then it may be possible to distinguish one dial from the others.

Figure 8:
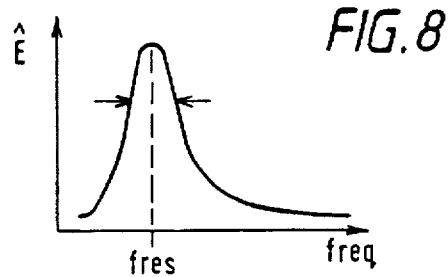
FIG. 8 shows how the magnitude E of the EMF induced in the pick-up coils varies with frequency.

FIG. 8 shows how the value of $\hat{E}$ for one dial varies with frequency. There is a sharp peak in the induced EMF at the resonant frequency. Therefore, when the frequency of the current in the drive coil is equal to the resonant frequency of a dial, the coupling effect from that dial will be significantly increased.

Consequently, by making the resonant frequency of each resonant circuit 87–97 different, it is possible to distinguish between the signals from the six dials by applying a current of different frequencies to the drive coil 51.

Figure 9:
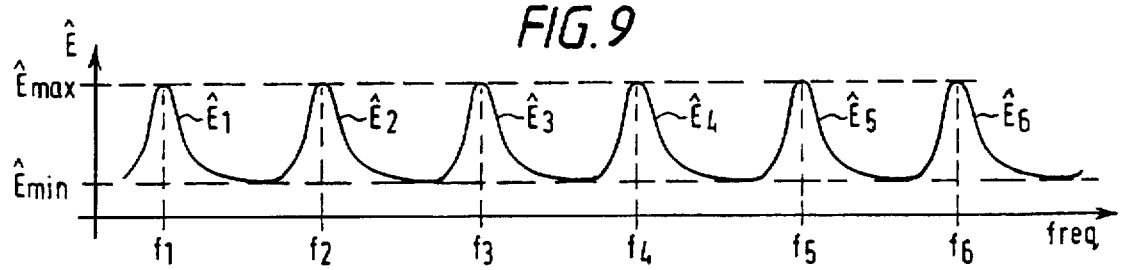
FIG. 9 shows a spread of resonant frequencies for the dials which may be used when the bandwidth available is large.

FIG. 9 shows how the peak magnitude $\hat{E}$ of the EMF induced in the pick-up coils 53, 55 by each dial varies with frequency. Along the abscissa are marked the resonant frequencies $f_1$–$f_6$ of each dial, where the subscript represents the number of the dial. In this embodiment, there is an increase in frequency from one resonant frequency to the next of about 20%, i.e. $f_2=f_1+20\%f_1$, $f_3=f_2+20\%f_2$ etc. In the current embodiment the sensing system is operated between 1–10 MHz. Again, however, the invention is not limited to this and the system should work at most practical frequencies. In this example, the bandwidth available is sufficiently large that the signals from the neighbouring coils do not interfere. Unfortunately, with such a large bandwidth, the electronics becomes complex and hence more expensive. FIG. 9 also shows that the maximum value of EMF induced in the pick-up coils by each dial ($\hat{E}_{max}$) is a constant. This is not essential, though it simplifies the required calculations in the microprocessor 105.

Figure 10:
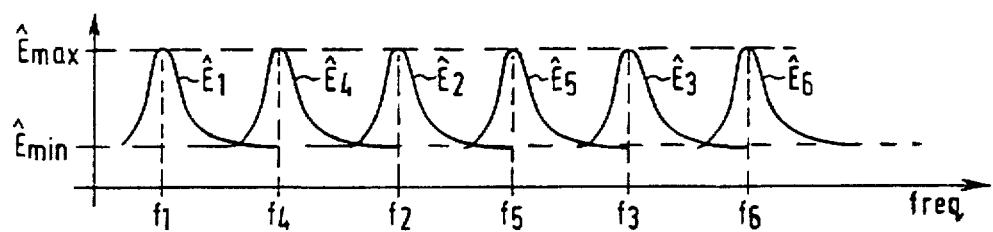
FIG. 10 shows a spread of the resonant frequencies which may be used for the dials when the available bandwidth is limited.

FIG. 10 shows an example where the bandwidth available is smaller. Since the resonant frequencies are much closer together, the characteristic of each dial begins to overlap with the characteristic of the neighbouring resonant frequency dial. This means that the dials having adjacent resonant frequencies may couple with each other. One method of reducing this effect, is by physically separating the dials with neighbouring resonant frequencies.

FIG. 10 illustrates an example of this, dial 1 has the lowest resonant frequency $f_1$, dial 4 has the second lowest frequency $f_4$, dial 2 has the next lowest frequency $f_2$ etc. Although FIG. 10 shows one method of physically separating the neighbouring resonant frequencies, it will be apparent to those skilled in the art that there are many different ways of achieving this.

Therefore, by applying a signal having the same frequency as the resonant frequency of one of the dials, signals $S_{53}$, $S_{55}$ at the output of low pass filters 103 will be substantially due to the coupling effect from that dial. Therefore, by applying a signal with the resonant frequency of each dial in turn to the drive coil, the orientation of each dial can be calculated within the microprocessor 105 in a conventional manner by using the normal arctangent function, i.e. $\theta$=arctan ($\sin\theta$, $\cos\theta$), which provides an isomorphic mapping over the interval $0<\theta<2\pi$.

Furthermore, since there are only a limited number of practical positions each dial can be in, it is also possible to compare the received signals with a look up table and generate the position of each dial that way. Such processing is well known in the art and therefore need not be explained further.

Although FIG. 3a shows the coil wound around the wheel hub from one side edge to the opposite side edge, in end view, the mounting of the wheel hub coil 65 is not restricted by this. In practice, a reasonable coupling from the drive coil 51 to the pick-up coils can be achieved when the angle between the plane of the wheel hub coil 65 and the plane of the dial, i.e. angle $\psi$, lies within the range of 20° to 80°.

Figure 3B:
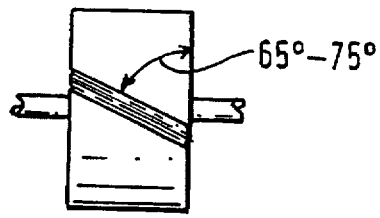
FIG. 3b diagrammatically illustrates the preferred range of the angle between the plane of the resonator and the plane of the dial.

However, the analysis above is a simplistic view of the coupling of the signal applied to the drive coil 51 to the pick-up coils 53 and 55, and does not take into account the cross coupling that will exist between the resonant circuits of the dials. It will be apparent to those skilled in the art that the coupling between the resonant circuits 87–97 is dependent upon the angle between the plane of the wheel hub coil 65 and the plane of the wheel hub itself i.e. angle $\psi$. For minimum cross coupling this angle should be as near to 90° as possible. However, under such circumstances the coupling from the drive coil to the pick-up coils will also be at a minimum. Therefore, it is more preferable if $\psi$ lies within the range of 65° to 75°, as shown in FIG. 3b.

Figure 11:
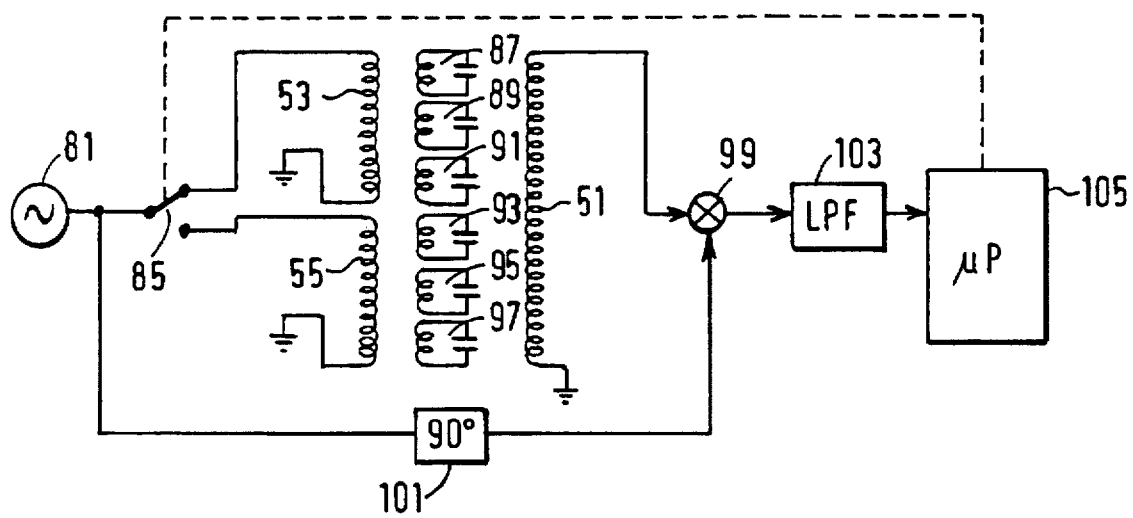
FIG. 11 is an electrical equivalent circuit of the meter system according to a second embodiment.

FIG. 11 shows the electrical equivalent circuit of a second embodiment. The physical arrangement of the dials and coils are the same as in the first embodiment and so will not be explained further. In FIG. 11, an interrogating voltage source 81 is applied to the two coils 53 and 55 alternately, through switch 85. When energised, coils 53 and 55 induce an EMF in each of the resonant circuits 87–97. The magnitude of the induced EMF in each resonant circuit will depend on the relative position of the respective dial and the coil inducing the EMF. In fact, the induced EMF is amplitude modulated by $\cos \theta_i$ when coil 53 is energised and $\sin \theta_i$ when coil 55 is energised, where $\theta_i$ is the same as in the first embodiment.

The induced EMF in the resonant circuits 87–97, causes a current to flow, the magnitude of which depends on the impedance of the resonant circuit and hence the frequency of the applied voltage. An EMF is then induced in coil 51 proportional to the currents flowing in the resonant circuits 87–97.

In this embodiment, coils 53 and 55 are used as drive coils and coil 51 is used as a pick-up coil. The signal 'picked-up' is then demodulated and applied to a microprocessor 105 through the mixer 99 and low pass filter 103, just as in the first embodiment. However, in this embodiment, the signal introduced into the microprocessor will be a time multiplexed version of the signals from coils 53 and 55. Therefore, it will be necessary for the microprocessor to control, or have knowledge about, the timing of the switching of switch 85, so that it will know when it is receiving the signal from coil 53 and when it is receiving the signal from coil 55.

The method of extracting the dial information and the method of exciting the drive coils with different frequencies in order to obtain the information about each dial is the same as in the second embodiment of the present invention and so will not be explained further. This method is possible because the dials are rotating at a much slower rate compared to the rate at which the applied interrogating signal changes. Therefore, there will be no adverse effects resulting from the switching.

Figure 12:
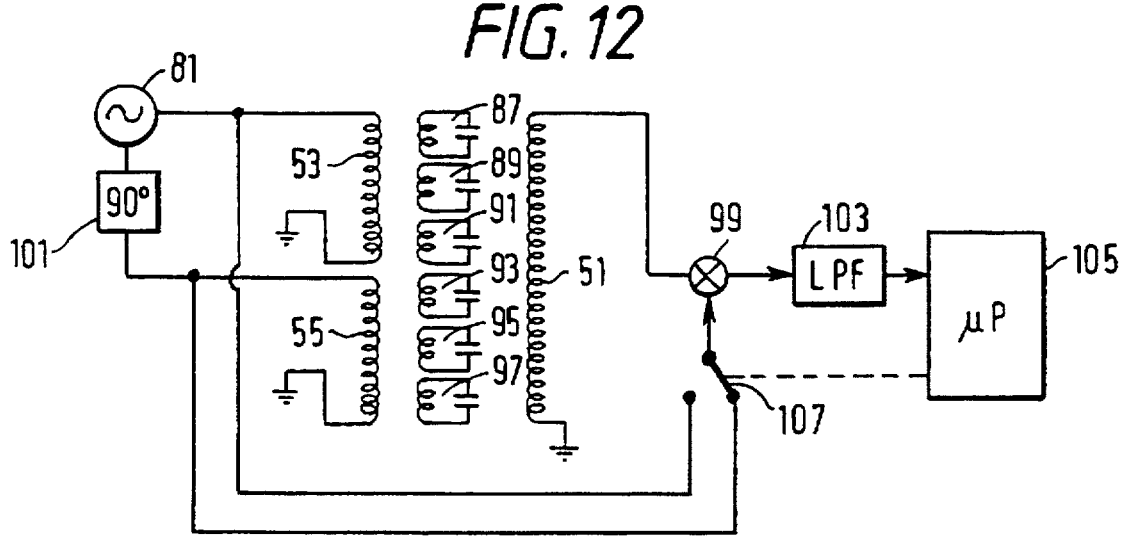
FIG. 12 is an electrical equivalent circuit of the meter system according to a third embodiment.

FIG. 12 shows the electrical equivalent circuit of a third embodiment. The physical arrangement of the dials and coils is the same as in the first embodiment and so will not be explained further. In this embodiment, the interrogating voltage source 81 is applied directly to coil 53 and a 90° phase shifted version is applied to coil 55. The currents in these two coils induce EMFs in the resonant circuits 87–97, the magnitudes of which depend on the position of the respective dials.

As in the second embodiment, the induced EMF causes a current to flow in each resonant circuit, which in turn induces an EMF in coil 51. However, in this embodiment, the signal 'picked-up' by coil 51 is a quadrature signal. Therefore, in order to demodulate the signal and obtain the sine and cosine information the signal on coil 51 is applied to a mixer 99b where it is mixed with a version of the signal applied to coil 53 or with a version of the signal applied to coil 55 depending on the position of switch 107. Therefore, by switching the switch 107, the signal at the output of the low pass filter 103 will be a time multiplexed signal containing the information about $\sin \theta_i$ and $\cos \theta_i$. This signal is then passed into the microprocessor 105, where the position of each dial is calculated in the same manner as in the second embodiment.

Figure 13:
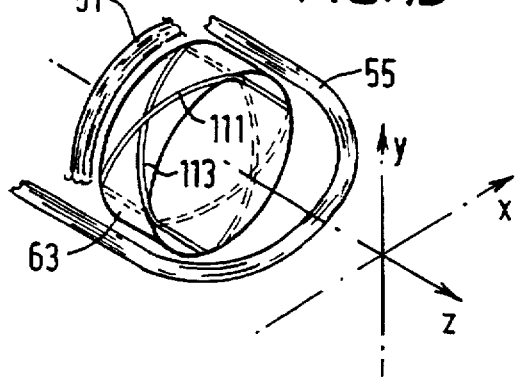
FIG. 13 is a diagrammatic view showing a wheel and parts of the coils in a fourth embodiment.

FIG. 13 shows diagrammatically, the construction of one dial and parts of the drive and pick-up coil used in a fourth embodiment. In FIG. 13, there is a drive coil 51, a pick-up coil 55 and two resonant circuits 111 and 113 comprising a coil and a capacitor, such that the resonant frequency of each circuit is different.

In this embodiment, drive coil 51 has the same axis as the wheel hub 63 and pick-up coil 55 lies in a plane perpendicular thereto, and for simplicity, the coils of resonant circuits 111 and 113 are perpendicular to each other so that there is no coupling between them. This is not essential, the two coils 111 and 113 may be non-orthogonal, but in such a system the relative orientation of the resonator coils must be known.

In operation, the drive coil 51 induces an EMF in the two resonant circuits 111 and 113. The currents produced by these EMFs depends on the frequency of the current in the drive coil. If the drive coil current has the same frequency as the resonant frequency of circuit 111, then the current that will flow therein will be very large while the current in circuit 113 will be nominal.

Similarly, if the frequency of the current in the drive coil is equal to the resonant frequency of circuit 113, then the current that will flow therein will be very large and the current that will flow in circuit 111 will be nominal.

The current flowing in the resonant circuits will induce an EMF in the pick-up coil 55, the magnitude of 25 which will depend on the sine of the angle $\theta$, just as in the other embodiments. However, by energising circuit 111 then 113 in turn, information about $\sin \theta$ and information about $\sin (90+\theta)$ ($= \cos \theta$ since the two coils are separated by 900) will be picked-up on coil 55. The remaining signal processing required to extract this information from the signal on pick-up coil 55, is the same as in previous embodiments and so will not be explained further.

Although in the above fourth embodiment, circuits 111 and 113 were energised in turn, it will be evident to the man skilled in the art that they may both be excited at once. Furthermore, coil 51 may be used as the pick-up coil and coil 55 may be used as the drive coil.

As mentioned above, with reference to the first embodiment, the inductively coupled resonant circuit(s) associated with each dial is subject to cross coupling from those of the other dials. One method of reducing the cross coupling is by driving the resonator circuit(s) capacitively.

Figure 14A:
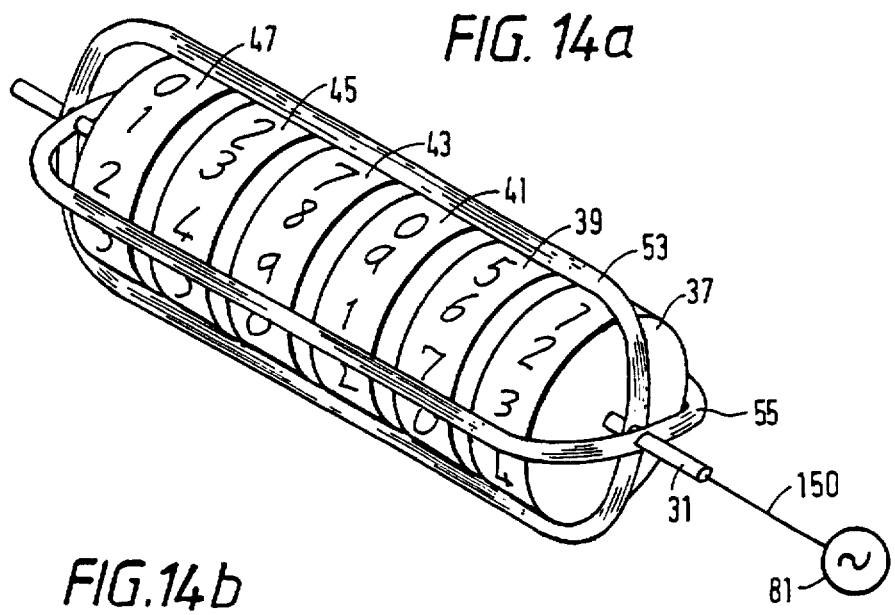
FIG. 14a is a diagrammatic isometric view on an enlarged scale of the dial arrangement in a fifth embodiment.

FIG. 14a shows a fifth embodiment. In this form, as in the first form, coils 53 and 55 act as pick-up coils, with one end of the coils connected to ground and the other connected to the inspection point (now shown).

However, in this embodiment there is no drive coil 51, instead the drive voltage is supplied directly to the spindle 31 via wire 150, and the effective return path for this circuit is via capacitance from the outside of the dials to ground, for example to the dial housing 29.

Figure 14B:
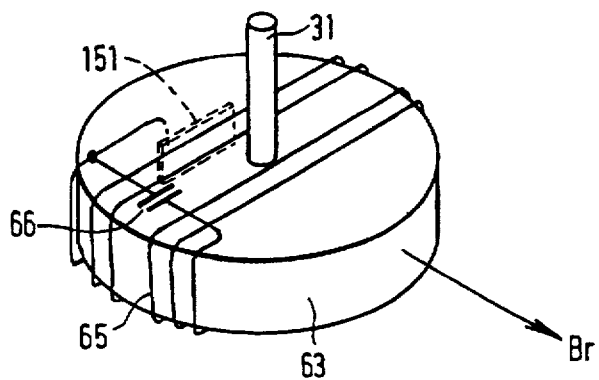

FIG. 14b shows the construction of one of the dials for use in this fifth embodiment. Within the dial, there is a conductive plate 151 mounted adjacent the spindle 31, thereby forming a capacitor therewith. Attached to the conductive plate, is a resonant circuit comprising a capacitor 66 and inductive coil 65. The resonant circuit is arranged in such a way that the magnetic axis $B_r$ of the inductive coil is perpendicular to the axis of the spindle, as shown.

Figure 14C:
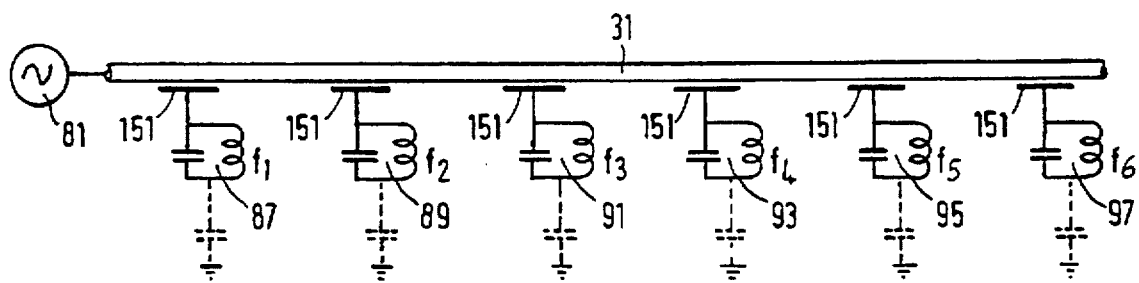
FIG. 14c is an electrical equivalenet circuit of dial system according to the fifth embodiment.

In operation, when an interrogating voltage is applied to the spindle, a corresponding electric current is capacitively coupled into the resonant circuit, the magnitude of which is dependent upon the frequency of the applied interrogating voltage and will be a maximum when this frequency is the same as the resonant frequency of the resonant circuit. The current flowing in the coil 65 of the resonant circuit, as in the other embodiments, creates a magnetic flux density in the direction of its axis. In this embodiment, this will be perpendicular to the axis of the dial. Therefore as the dial rotates, the magnetic flux induces an EMF in each of pick-up coils 53 and 55. The magnitudes of the induced EMFs will be dependent on the orientation of the dial. And, since the coils 53, 55 are orthogonal in this embodiment, the amplitudes of the EMFs induced in these coils will be in quadrature. FIG. 14c shows an electrical equivalent circuit of the drive and resonant circuits for each dial in this embodiment. The inputs to the resonators 87–97 are between shaft 31 and the respective plates 151 which together form a capacitor whose value is independent of dial angular position. By making the resonant frequency of each dial different, as in the other embodiments, it is possible to distinguish between the signals from each dial by applying a voltage of different frequencies to the spindle 31. This mechanism, and the method of calculating the orientation of each dial from the signals received from the pick-up coils, has already been described fully in the previous embodiments and will therefore not be described further.

In another embodiment, it is possible to provide an arrangement similar to that shown in FIG. 14a, but in which plate 151 is circular in cross-section and surrounds the spindle 31. A second plate is then provided around the periphery of the wheel hub, such that the resonant circuit is connected between the two plates. In such a form, it is preferable that the inside plate is arranged such that it is opaque to the resonant magnetic field produced by the coil, so that this plate does not affect the resonance -of the LC circuit, and that the outer plate is transparent to the resonant magnetic field so that the field can pass through the transparent plate for coupling with the pick-up coils. The transparent plate may be provided by utilising a low conductivity type plate or alternatively having radial slots therearound.

It will be apparent to those skilled in the art, that coupling between the resonant circuits and the pick-up means may also be done capacitively, for example, by changing the pick-up means from coils to parallel plates, arranged such that the set of dials are mounted between the plates.

It will be apparent to those skilled in the art that the modifications made to the first embodiment in the second, third and fourth embodiments can equally apply to the above fifth embodiment. For example coils 53 and 55 may be used as drive coils and the output signal for demodulation and processing would then be available on wire 150.

A number of modifications of which the reader will appreciate can be applied to any of the above embodiments will now be described.

Although in the first embodiment, the signals produced from the pick-up coils 53 and 55 are applied to different mixers and low pass filters, they may alternatively be applied to a single mixer and single low pass filter, with the input thereto being switched between pick-up coil 53 and pick-up coil 55. In this embodiment, the signal delivered to the microprocessor will have the same time multiplexed nature as in the second embodiment and the dial position is determined in the same way.

Figure 15:
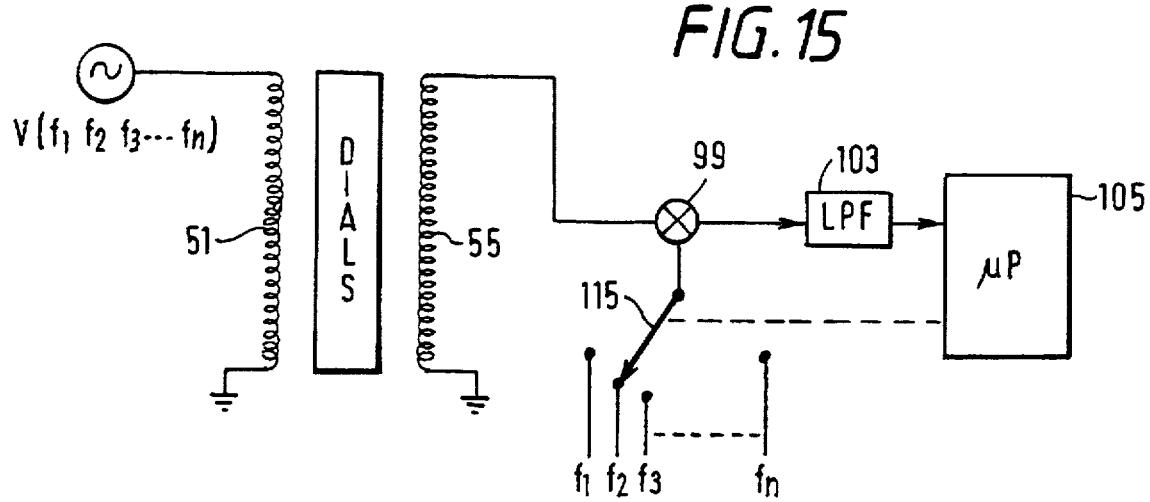
FIG. 15 is an electrical equivalent circuit demonstrating a method of demodulating the signals when all frequencies are applied at once, with respect to the fourth embodiment.

FIG. 15 shows a method of detecting the position of the dials when the voltage applied to the drive coil contains all the resonant frequencies at once. For the purposes of illustration, this is described in relation to the fourth embodiment but is equally applicable to the other forms. In FIG. 15, the signal picked up by coil 55 will contain all the information about each dial spread over the different frequency components. In order to extract the information, the signal is mixed with each resonant frequency in turn, using switch 115. In this case there are twelve resonant frequencies two for each dial. The resulting signal, after filtering, will be a time multiplexed signal of the sine and cosine terms for each dial. Therefore, as long as the microprocessor has knowledge about the resonant circuits of each dial and the position of the switch 115, it will be able to determine the orientation of each dial.

Furthermore, although the applied voltage may be stepped or swept through the required range of frequencies or all the frequencies may be applied simultaneously, other alternatives are possible. For example, the applied voltage-could comprise a burst of the required frequencies generated simultaneously or, in some situations, could be in the form of a burst of noise, such as white noise, containing a large number of frequencies in addition to those required for causing resonance.

In the embodiments above, the arrangement of drive coil(s) and pick-up coil(s) are such that the planes of these coils are orthogonal, and in the inductive embodiments, one of the coils has an axis which is the same as the axis of rotation of the dial. Such a configuration, while providing output signals in a convenient form for processing, is not essential. For example, the angles between the planes of the coils need not be 90° and/or the coils can be arranged so that none of them has an axis which is the same as, or even parallel to, the axis of rotation of the dial. As the skilled reader will understand, additional processing will then be necessary to remove additional components of the output signal introduced by such coil arrangements.

In the inductive embodiments above, coil 51 is shown as being wound in regions between the dials 37 to 47. However, as a modification, it is possible to wind coil 51 in turns with a diameter sufficiently large that the coil lies outside the periphery of the dials, or even over the coils 53, 55, and may have as few as 10 turns across the set of dials.

Further, in all the above embodiments, two outputs per dial have been used, i.e. two distinct outputs or a time multiplexed output. However, more than two could be obtained by using more than two non-parallel detection means or two or more non-parallel resonators. However, in such a system the relative orientation of the non-parallel detector means or resonators must be known, and the arrangement gives rise to unnecessary complexity.

As a further modification, it would be possible to provide additional drive, pick-up and coupling means to provide signals indicating rotation about three independent axes.

Where the invention is applied to multiple dials, the selectivity of the system to distinguish between each dial depends on the resonant characteristic shown in FIG. 8 for each dial. Ideally this should have a high maximum value, a low minimum value and a narrow peak width if the selectivity is to be high.

One method of improving the characteristic of this curve is to wind the coil 65, associated with the dial around a ferrite core. This also enables a smaller coil to be used which also reduces the cross coupling between the coils of each dial. Another method of improving this characteristic is to use finer Litz wire or to increase the diameter of the coil winding. However, the amount by which the diameter of the coil winding can be increased is limited by the amount of cross coupling with the other resonators, which is more important than the magnitude of the output.

Figure 17A:
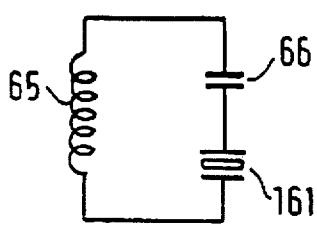
FIG. 17a is an electrical equivalent circuit of an alternative construction of the coupling device on each dial.
Figure 17B:
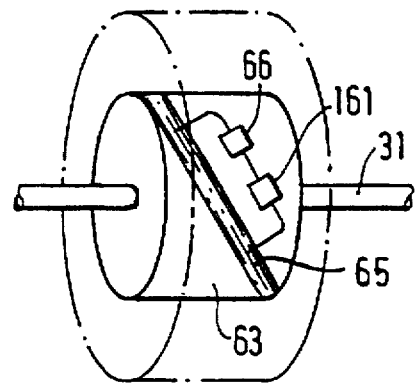

Another method of sharpening the resonance characteristics of the resonator shown in FIG. 17a, is to employ a ceramic type resonator 161 in series with the wheel hub coil 65 and capacitor 66. In such an embodiment, the values of the inductance of coil 65 and the value of the capacitance of capacitor 66 are preferably chosen so that their impedances cancel at the resonant frequency of the ceramic resonator. Use of a ceramic resonator narrows the bandwidth required for a multi-dial device since the width of the peaks shown in FIGS. 9 or 10 are much narrower. Therefore the increase in frequency from one resonant frequency to the next can be about 5%, i.e. $f_2=f_1+5\%f_1$ etc. The ceramic resonators 161 are preferably suitable for surface mounting onto printed circuit boards. Suitable ceramic resonators are supplied by AVX Kyocera, Stafford House, Station Road, Aldershot, Hants, United Kingdom or Murata, distributed by Cirkit, Mercury House, Calleza Park, Aldermaston, Reading, Berkshire, United Kingdom, and may be mounted as shown in FIG. 17b.

When a ferrite core is used for improving the characteristic of the resonators, there is the problem of how to install it around the shaft.

Figure 18:
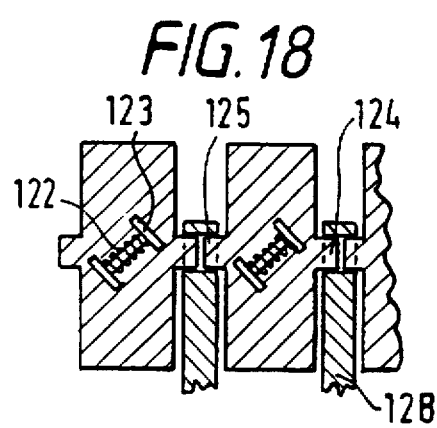
FIG. 18 diagrammatically illustrates another method of mounting the wheels when a ferrite core is used in the resonant circuit.

FIG. 18 shows one solution to this problem. In FIG. 18, a coil 122 is wound around a ferrite core 123, and a capacitor (not shown) is connected to the ends of the coil thereby forming a resonant circuit. In this embodiment, the resonant circuit is mounted at the centre of the dial, with the axis of the coil directed at an angle to the axis of the dial. In this type of dial, it is difficult to pass a spindle through the centre, therefore the ends of each dial 125 and 127 may be supported by wheel supports 128.

Figure 19:
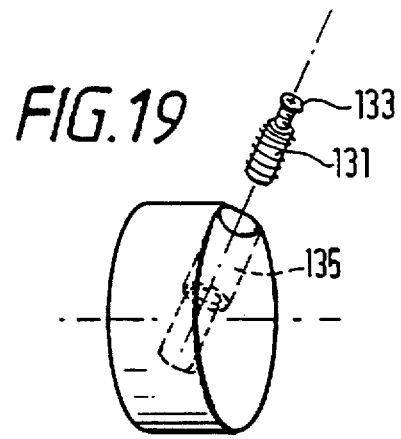
FIG. 19 diagrammatically shows the use in a wheel of a tuneable inductance core in a further alternative.

The accuracy of the remote sensing system will depend on the manufacture of the coupling circuits associated with each dial. Therefore, if these circuits can be tuned after manufacture, then this may improve the performance of the system. FIG. 19 shows one method of achieving this. In FIG. 19, a variable inductance core 131 is tuned by moving a screw 133 in or out of the coil. In this embodiment, the dial is manufactured so as to allow insertion of the variable inductance core through hole 135 which has an opening to allow adjustment by means of a small screwdriver. Another method is to use a trimming capacitor or alternatively, if the resonators can be manufactured to within 5%, then the voltage source can be programmed to sweep through a ±5% frequency span.

Another factor that could affect the performance of the above embodiments is the self resonance of the drive and pick-up coils. This can be mitigated by ensuring that their resonant frequencies are above the highest of the wheel resonant frequencies.

Figure 16A:
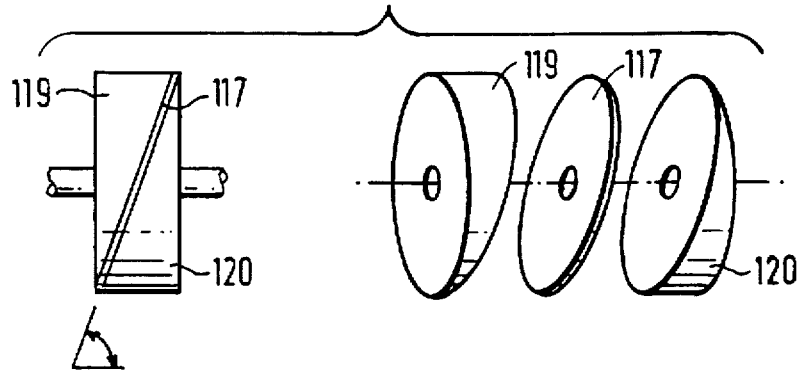
FIG. 16a diagrammatically illustrates the construction of the wheels in another embodiment.
Figure 16B:
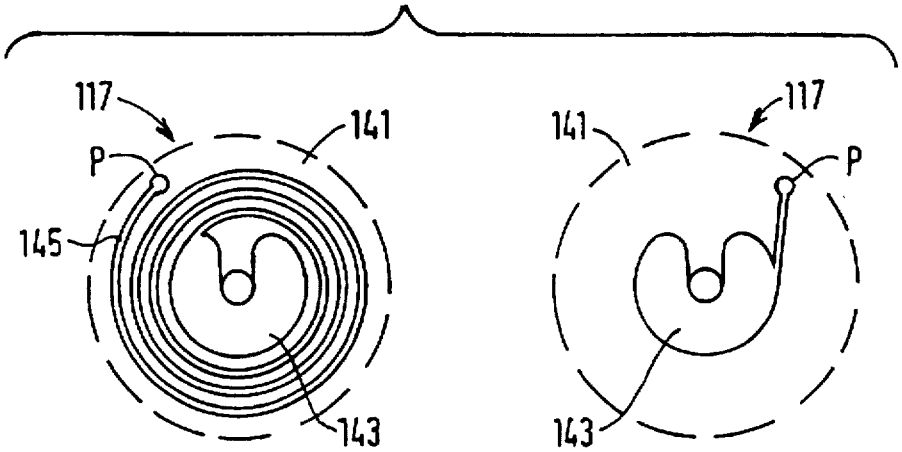

In all of the above embodiments, a resonant circuit, comprising a coil and capacitor, has been used to couple the current flowing in the drive means into the pick-up means. This is not the only way of achieving such coupling. For example, as shown in FIG. 16a, a planar etched LC resonator 117, like those used for electronic article security labels, may be used and is inclined at an angle to the plane of the dial as shown. Such planar LC resonators may be of conventional shape and construction, for example as shown in FIG. 16b in which a film of polypropylene or other suitable insulating material 141 of about 6 microns thickness has on one side a thin aluminium layer of about 5 microns thickness and on its other side there is a thicker aluminium layer e.g. of about 25 microns thickness. The thick aluminium layer forms one plate of a capacitor 143 and continues therefrom as a coil 145 which winds around the one plate of the capacitor 143 in the manner shown until it reaches point P, where there is a via in the polypropylene film, through which it passes to the opposite face carrying the thin aluminium layer which forms the second plate of the capacitor 143 as shown. The polypropylene film 141 thereby acting as a dielectric increasing the capacitance of the capacitor 143. The two layers of aluminium are then connected together through the via at point P, thereby creating a LC resonant circuit, whose resonant frequency will depend upon the area of aluminium forming the plates of the capacitor.

As shown in FIG. 16a, the planar etched LC resonator 117 is sandwiched between one or preferably two parts 119 and 121 of the wheel hub.

The use of magnetostrictive elements is also possible. In that case, each dial has associated therewith a magnetostrictive element or elements responsive to a particular frequency that can couple the signal from the drive to the pick-up means in dependence upon the relative orientation of the dial. The bias magnetic field needed for each magnetostrictive element may be provided by applying a constant DC signal to the drive, or preferably by mounting small magnets on each dial arranged so as to provide the required bias. In such an embodiment, the problem of inter-resonator coupling is largely reduced due to the lower electromechanical coupling. However, the system then becomes susceptible to external magnetic fields which may affect the biasing.

Figure 20:
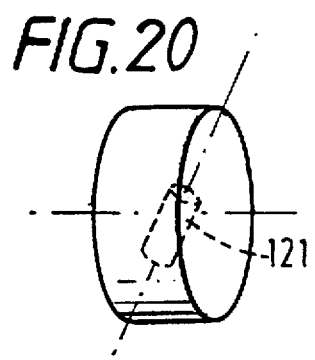
FIG. 20 diagrammatically shows a wheel having an internal ferrite core resonator in an alternative embodiment.

FIG. 20 shows an alternative to the LC resonant circuit, in which a length of ferrite material 121 is placed within the dial, so that it lies at an angle to the axis of the dial and passes through the centre of it. In this embodiment it is possible to distinguish between the dials by making the length of ferrite material different in the different dials thereby giving each dial a different mechanical resonant frequency.

Figure 21:
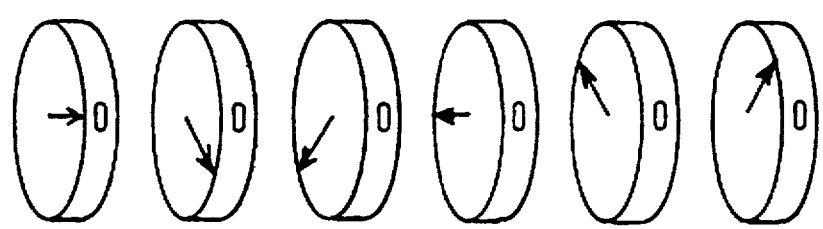
FIG. 21 shows a set of dials marked so that they can be assembled in appropriate sequence.

In all the above embodiments, since each wheel is identified by the characteristic of its coupling element, it is important that the set of dials when assembled are in the correct order. FIG. 21 shows one method, whereby each wheel is marked so that when assembled with the zeros aligned, the marks form a spiral pattern, so incorrect wheel ordering would disrupt the spiral.

Another issue related to wheel positioning is error introduced by off-axis movement (wobble). This may be reduced by using longer wheel bearings, closer bearing tolerances, and selecting a sufficiently large angle between resonator coils and the wheels.

The interrogating signal may be generated by using a Voltage Controlled Oscillator (VCO) or a crystal and a programmable frequency divider.

The basic signal processing device that may be employed is a two channel (or switched channel) analogue-to-digital converter which is followed by a wheel position calculator and an output data formatter. The wheel position calculation involves an arctangent function but, because so few values are required, it may be better to use a look-up table stored in a chip or other memory device.

All the above functions can be provided by a single integrated circuit chip which could either be a microcontroller or a custom ASIC (application specific integrated circuit). Furthermore, the same chip can also provide the stepped, swept or burst frequency excitation to the drive coil.

I claim:

1. A rotary position encoder, comprising:

a plurality of rotatable members;

a plurality of electrically resonant circuits mounted in respective rotatable members for rotation therewith, each electrically resonant circuit of said plurality being resonant at a frequency different to those of the other resonant circuits so as to be distinguishable therefrom;

an excitation circuit electromagnetically coupled in common to said plurality of resonant circuits for applying thereto excitation signals at the different respective resonant frequencies; and a sensing circuit electromagnetically coupled in common to said resonant circuits for outputting signals which vary with the angular position of said rotatable members;

wherein said plurality of electrically resonant circuits, said excitation circuit and said sensing circuit are arranged such that the degree of electromagnetic coupling between each resonsant circuit and at least one of the excitation circuit and the sensing circuit varies as a function of the angular position of the corresponding rotational member, whereby, upon energization by said excitation circuit at its respective resonant frequency, each resonant circuit generates an alternating electromagnetic field at its resonant frequency dependent upon the degree of coupling between the energizing circuit and the resonant circuit, which alternating electromagnetic field induces an alternating output signal at the resonant frequency in said sensing circuit whose amplitude varies in dependence upon the angular position of the corresponding rotatable member whereby each rotatable member is identifiable by its resonant frequency and its angular position is measurable by said amplitude.

2. An encoder according to claim 1, wherein the degree of electromagnetic coupling between each resonant circuit and one of said excitation circuit and said sensing circuit is substantially independent of the angular position of the corresponding rotatable member.

3. An encoder according to claim 2, wherein the other one of said excitation circuit and said sensing circuit comprises first and second substantially planar coils.

4. An encoder according to claim 3, wherein said first and second substantially planar coils lie at an angle to each other.

5. An encoder according to claim 4, wherein said angle is substantially 90°.

6. An encoder according to claim 3, wherein said other one of said excitation circuit and said sensing circuit is said sensing circuit, whereby each resonant circuit energizes, in response to energization by said excitation circuit, the first and second coils to produce a first output signal in said first coil and a second, different output signal in said second coil.

7. An encoder according to claim 4, wherein each resonant circuit is inductively coupled to said excitation circuit.

8. An encoder according to claim 5, wherein said excitation circuit comprises an excitation coil having an axis that is substantially the same as the axis of rotation of said rotatable members.

9. An encoder according to claim 8, wherein the axis of said excitation coil is substantially orthogonal to the axis of said first coil and substantially orthogonal to the axis of the second coil.

10. An encoder according to claim 6, wherein each resonant circuit is capacitively coupled to said excitation circuit.

11. An encoder according to claim 10, wherein said excitation circuit comprises a conductive spindle about which said rotatable members rotate.

12. An encoder according to claim 11, wherein the axis of said spindle is substantially orthogonal to the axis of the first coil and substantially orthogonal to the axis of the second coil.

13. An encoder according to claim 3, wherein said other one of said excitation circuit and said sensing circuit is said excitation circuit, whereby each resonant circuit energizes, in response to energization by said first and second coils, said sensing circuit to produce respective first and second output signals therein.

14. An encoder according to claim 13, wherein each resonant circuit is inductively coupled to said sensing circuit.

15. An encoder according to claim 14, wherein said sensing circuit comprises a sensing coil having an axis that is substantially the same as the axis of rotation of said rotatable members.

16. An encoder according to claim 15, wherein the axis of said sensing coil is substantially orthogonal to the axis of said first coil and substantially orthogonal to the axis of said second coil.

17. An encoder according to claim 13, wherein each resonant circuit is capacitively coupled to said sensing circuit.

18. An encoder according to claim 17, wherein said sensing circuit comprises a conductive spindle around which said rotatable members rotate.

19. An encoder according to claim 18, wherein the axis of said spindle is substantially orthogonal to the axis of said first coil and substantially orthogonal to the axis of said second coil.

20. An encoder according to claim 3, wherein each resonant circuit is inductively coupled to each of said first and second coils.

21. An encoder according to claim 2, wherein each rotatable member has first and second electrically resonant circuits mounted for rotation therewith that are electromagnetically coupled to said excitation circuit and said sensing circuit such that both said first and second resonant circuits generate, when energized by said excitation circuit, an electromagnetic field proportional to the degree of coupling between the excitation circuit and the resonant circuit, which electromagnetic fields induce first and second output signals in the sensing circuit characteristic of and dependent upon the angular position of the corresponding rotatable member, the electromagnetic field generated by said second resonant circuit having an axis different from the axis of the electromagnetic field generated by the corresponding first resonant circuit, thereby causing the output signal induced in said sensing circuit by said second resonant circuit to be different from the output signal induced in said sensing circuit by the corresponding first resonant circuit.

22. An encoder according to claim 21, wherein the axis of the electromagnetic field generated by each first resonant circuit is substantially orthogonal to the axis of the electromagnetic field generated by each corresponding second resonant circuit.

23. An encoder according to claim 21, wherein each resonant circuit is inductively coupled to said one of said excitation circuit and said sensing circuit.

24. An encoder according to claim 23, wherein said one of said excitation circuit and said sensing circuit comprises a coil having an axis that is substantially the same as the axis of rotation of said rotatable members.

25. An encoder according to claim 24, wherein said one of said excitation circuit and said sensing circuit is said excitation circuit and wherein said sensing circuit comprises a substantially planar sensing coil having an axis lying at an angle to the axis of said coil.

26. An encoder according to claim 25, wherein said angle is substantially 90°.

27. An encoder according to claim 21, wherein each resonant circuit is capacitively coupled to said one of said excitation circuit and said sensing circuit.

28. An encoder according to claim 27, wherein said one of said excitation circuit and said sensing circuit comprises a conductive spindle around which said rotatable members rotate.

29. An encoder according to claim 28, wherein said one of said excitation circuit and said sensing circuit is said excitation circuit and wherein said sensing circuit comprises a substantially planar coil having an axis lying at an angle to the axis of the spindle.

30. An encoder according to claim 29, wherein said angle is substantially 90°.

31. an encoder according to claim 2, wherein each resonant circuit is capacitively coupled to said excitation circuit and to said sensing circuit.

32. An encoder according to claim 1, wherein each resonant circuit comprises an inductor and a capacitor or an inductor and a ceramic resonator.

33. An encoder according to claim 32, wherein each inductor comprises a coil which lies in a plane which extends at a constant angle to the axis of rotation of the corresponding rotatable member.

34. An encoder according to claim 33, wherein said constant angle lies between 20° and 80°.

35. An encoder according to claim 1, wherein each said rotatable member is a dial of a meter.

36. A method of determining the angular position of a plurality of rotatable members, said method comprising the steps of:

providing a plurality of electrically resonant circuits mounted in respective rotatable members for rotation therewith, each electrically resonant circuit of said plurality being resonant at a frequency different to those of the other resonant circuits so as to be distinguishable therefrom;

providing an excitation circuit electromagnetically coupled in common to said plurality of resonant circuits;

providing a sensing circuit electromagnetically coupled in common to said resonant circuits;

arranging the plurality of electrically resonant circuits, the excitation circuit and the sensing circuit to be such that the degree of electromagnetic coupling between each resonant circuit and at least one of the excitation circuit and the sensing circuit varies as a function of the angular position of the corresponding rotatable member;

using said excitation circuit to energize each resonant circuit at its respective resonant frequency; and detecting the output signals induced in said sensing circuit as a result of the energizing of said resonant circuits, and deriving from the detected output signals the angular position of said plurality of rotatable members.

37. A method according to claim 36, wherein said resonant frequencies lie in the range of 1 to 10 MHz.

38. A method according to claim 37, wherein said resonant circuits are energized using one of: a swept frequency excitation technique, a burst frequency excitation technique or a stepped frequency excitation technique.

39. An apparatus for remotely indicating the angular position of a plurality of rotatable members each having an electromagnetic intermediate device (EID) mounted for rotation therewith the apparatus comprising:

input means for electromagnetically energizing each EID;

output means electromagnetically coupled to each EID, each EID being an electrically resonant circuit having a resonant frequency different to those of the other EIDs in that each EID generates when energized by said input means, an electromagnetic field proportional to the degree of coupling between the input means and the EID, which electromagnetic field induces an output signal in said output means characteristic of and dependent upon the angular position of the corresponding rotatable member, and in that the degree of electromagnetic coupling between each EID and at least one of the input means and the output means varies as a function of the angular position of the corresponding rotatable member, thereby causing said output signal to vary in dependence upon said angular position, wherein the degree of electromagnetic coupling between each EID and one of said input means or said output means is substantially independent of the angular position of the corresponding rotatable member;

wherein each rotatable member has a second EID mounted therewith that is electromagnetically coupled to said input means and said output means such that said second EID generates, when energized by said input means, an electromagnetic field proportional to the degree of coupling between the input means and the second EID, which electromagnetic field induces a second output signal in the output means characteristic of and dependent upon the angular position of the corresponding rotatable member, the electromagnetic field generated by said second EID having an axis different from the axis of the electromagnetic field generated by the corresponding first EID thereby causing the output signal induced by said second EID to be different from the output signal induced by the corresponding first EID.

40. An apparatus according to claim 39, wherein the axis of the electromagnetic field generated by each first EID is substantially orthogonal to the axis of the electromagnetic field generated by each corresponding second EID.

41. An apparatus according to claim 39, wherein each EID is inductively coupled to said one of said input means or said output means.

42. An apparatus according to claim 41, wherein said one of said input means or said output means is a coil having an axis that is substantially the same as the axis of rotation of said rotatable members.

43. An apparatus according to claim 42, wherein said one of said input means or said output means is said input means and wherein said output means comprises a substantially planar coil having an axis lying at an angle to the axis of the input coil.

44. An apparatus according to claim 43, wherein said angle is substantially 90°.

45. An apparatus according to claim 38, wherein each EID is capacitively coupled to said one of said input means or said output means.

46. An apparatus according to claim 45, wherein said one of said input means or said output means is a conductive spindle around which said rotatable members rotate.

47. An apparatus according to claim 46, wherein said one of said input means or said output means is said input means and wherein said output means comprises a substantially planar coil having an axis lying at an angle to the axis of the input spindle.

48. An apparatus according to claim 47, wherein said angle is substantially 90°.

* * * * *

UNITED STATES PATENT AND TRADEMARK OFFICE

CERTIFICATE OF CORRECTION

PATENT NO.  : 5,796,250
DATED       : August 18, 1998
INVENTOR(S) : Andrew N. DAMES It is certified that error appears in the above-identified patent and that said letters patent is hereby corrected as shown below:

Claim 7, line 1, change "42" to --6--.

Claim 8, line 1, change "5" to --7--.

Claim 45, line 1, change "38" to --39--.

Signed and Sealed this

Twelfth Day of January, 1999

Attest:

*Attesting Officer*                *Acting Commissioner of Patents and Trademarks*